United States Patent
Marti et al.

(10) Patent No.: US 11,532,319 B2
(45) Date of Patent: Dec. 20, 2022

(54) TECHNIQUES FOR SEPARATING DRIVING EMOTION FROM MEDIA INDUCED EMOTION USING AN ADDITIVE/SUBTRACTIVE, CONJUNCTIVE, DISJUNCTIVE, OR BAYESIAN TECHNIQUE IN A DRIVER MONITORING SYSTEM

(71) Applicant: HARMAN INTERNATIONAL INDUSTRIES, INCORPORATED, Stamford, CT (US)

(72) Inventors: Stefan Marti, Oakland, CA (US); Joseph Verbeke, San Francisco, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 199 days.

(21) Appl. No.: 16/820,533

(22) Filed: Mar. 16, 2020

(65) Prior Publication Data
US 2021/0287697 A1 Sep. 16, 2021

(51) Int. Cl.
| | |
|---|---|
| G10L 25/63 | (2013.01) |
| G06F 3/01 | (2006.01) |
| G06N 3/04 | (2006.01) |
| H04N 21/454 | (2011.01) |
| G10L 25/81 | (2013.01) |
| G06V 20/59 | (2022.01) |

(52) U.S. Cl.
CPC .......... *G10L 25/63* (2013.01); *G06V 20/597* (2022.01); *G10L 25/81* (2013.01)

(58) Field of Classification Search
CPC ....... G06F 3/011; G06N 3/0445; H04N 21/84
USPC .......................................................... 725/10
See application file for complete search history.

(56) References Cited

U.S. PATENT DOCUMENTS

| | | | |
|---|---|---|---|
| 10,403,304 B1* | 9/2019 | Gatto | G06N 3/0445 |
| 2015/0181291 A1* | 6/2015 | Wheatley | H04N 21/84 |
| | | | 725/10 |
| 2015/0254955 A1 | 9/2015 | Fields et al. | |
| 2017/0083757 A1* | 3/2017 | Enomoto | G06F 3/011 |
| 2018/0174457 A1 | 6/2018 | Taylor | |

OTHER PUBLICATIONS

Zhu et al., Scientific Research Publishing, "An Improved Three-Dimensional Model for Emotion Based on Fuzzy Theory", Journal of Computer and Communications, 2018, 6, 101-111, available at https://file.scirp.org/Html/8-1730884_87046.htm,11 pages.

(Continued)

*Primary Examiner* — Farzad Kazeminezhad
(74) *Attorney, Agent, or Firm* — Artegis Law Group, LLP

(57) ABSTRACT

One or more embodiments include an emotion analysis system for computing and analyzing emotional state of a user. The emotion analysis system acquires, via at least one sensor, sensor data associated with a user. The emotion analysis system determines, based on the sensor data, an emotional state associated with a user. The emotion analysis system determines a first component of the emotional state that corresponds to media content being accessed by the user. The emotion analysis system applies a first function to the emotional state to remove the first component from the emotional state.

20 Claims, 8 Drawing Sheets

(56) References Cited

OTHER PUBLICATIONS

"PAD emotional state model," Wikipedia, available at https://en.wikipedia.org/wiki/PAD_emotional_state_model, 3 pages.
Aljanaki et al., "Developing a benchmark for emotional analysis of music", PLOS One | DOI:10.1371/journal.pone.0173392 Mar. 10, 2017, 22 pages.

* cited by examiner

TECHNIQUES FOR SEPARATING DRIVING EMOTION FROM MEDIA INDUCED EMOTION USING AN ADDITIVE/SUBTRACTIVE, CONJUNCTIVE, DISJUNCTIVE, OR BAYESIAN TECHNIQUE IN A DRIVER MONITORING SYSTEM

BACKGROUND

Field of the Embodiments of the Present Disclosure

Embodiments of the present disclosure relate generally to psychophysiological sensing systems and, more specifically, to techniques for separating driving emotion from media induced emotion in a driver monitoring system.

Description of the Related Art

Computer-based recognition of human emotional state is increasingly being employed in a variety of applications. In one particular example, a driver monitoring system (DMS) may detect the emotional state of a driver in order to assess how the driver is reacting to various driving conditions associated with the vehicle, such as weather, traffic, and/or road conditions. Severe weather, heavy traffic, and poorly maintained roads may cause the driver to be in a distressed, angry, and/or agitated emotional state. By contrast, good weather, light traffic, and well-maintained roads may cause the driver to be in a calm, relaxed, and/or pleasant emotional state. In response to the assessment of the emotional state of the driver, the DMS may take certain actions, such as presenting suggestions and/or alerts to the driver in textual, or audio, or other forms, such as indicators, lights, haptic outputs, and/or the like.

One potential drawback to the techniques described above is that the emotional state of a driver may be due to multiple factors in addition to current driving conditions. For example, the emotional state of a driver may be affected by media content that the driver is listening to, such as music, news, talk radio, audio books, and/or the like. Further, the emotional state of a driver may be affected by an in-person conversation between the driver and a passenger or a phone conversation between the driver and one or more other persons. Aggressive music or an unpleasant conversation may cause the driver to be in a distressed, angry, and/or agitated emotional state, even under good driving conditions. By contrast, meditative music or a pleasant conversation may cause the driver to be in a calm, relaxed, and/or pleasant emotional state, even under stressful driving conditions. Such meditative music or pleasant conversation may lull the driver into a calm and relaxed state even under driving conditions where the driver should be alert and active. As a result, an assessment of driving conditions based on computer recognition of an emotional state of a driver may be incorrect where the emotional state is affected by factors other than the current driving conditions. Therefore, a DMS that relies on such an incorrect assessment of driving conditions may present incorrect information to the driver.

As the foregoing illustrates, improved techniques for determining user reactions to driving conditions would be useful.

SUMMARY

Various embodiments of the present disclosure set forth a computer-implemented method for computing and analyzing emotional state of a user. The method includes acquiring, via at least one sensor, sensor data associated with a user. The method further includes determining, based on the sensor data, an emotional state associated with a user. The method further includes determining a first component of the emotional state that corresponds to media content being accessed by the user. The method further includes applying a first function to the emotional state to remove the first component from the emotional state.

Other embodiments include, without limitation, a system that implements one or more aspects of the disclosed techniques, and one or more computer readable media including instructions for performing one or more aspects of the disclosed techniques.

At least one technical advantage of the disclosed techniques relative to the prior art is that data associated with the emotional state of a driver can be processed to more accurately separate the contributions to the emotional state of the driver due to driving conditions from the overall emotional state of the driver by removing contributions to the emotional state of the driver due to media content and/or other factors. As a result, a DMS may generate more appropriate responsive actions to the driver in response to the contributions of driving conditions to the emotional state of the driver. Another technical advantage of the disclosed techniques is that a central server system, that aggregates emotional state data from multiple drivers, may use the more accurate assessments of the contributions of driving conditions to the emotional states of the drivers to generate more accurate assessments of the overall favorability or unfavorability of the driving conditions in a particular area. These technical advantages represent one or more technological improvements over prior art approaches.

BRIEF DESCRIPTION OF THE SEVERAL VIEWS OF THE DRAWINGS

So that the manner in which the recited features of the one more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the disclosure subsumes other embodiments as well.

DETAILED DESCRIPTION

In the following description, numerous specific details are set forth to provide a more thorough understanding of certain specific embodiments. However, it will be apparent to one of skill in the art that other embodiments may be practiced without one or more of these specific details or with additional specific details.

As further described herein, existing emotion analysis systems are configured to determine the overall emotional state of a user. For example, an emotion analysis system associated with a driver monitoring system (DMS) may be configured to determine the overall emotional state of a driver of a vehicle. The overall emotional state of the driver may be a composite of various factors, including, without limitation, driving conditions, media content being accessed by the driver, an in-person conversation between the driver and a passenger, a phone conversation between the driver and a remotely located person, and/or the like. Certain applications associated with the DMS benefit from having an accurate assessment of the emotional state of the driver that is due to driving conditions, such as weather, traffic, and/or road conditions. In that regard, the emotion analysis system of the present disclosure determines one or more components of the emotional state of the driver that are due to factors other than driving conditions and removes those components from the overall emotional state of the driver. As a result, the remaining emotional state data represents the emotional state of the driver that is due to factors other than the removed components. In that regard, the remaining emotional state data more accurately represents the emotional state of the driver that is due to driving conditions.

In one example, the emotion analysis system determines the overall emotional state of the driver. The emotion analysis system then determines a component of the emotional state of the driver that is due to listening to or otherwise consuming media content. The emotion analysis system removes the component of the emotional state of the driver that is due to listening to media content from the overall emotional state of the driver. Additionally or alternatively, the emotion analysis system determines a component of the emotional state of the driver that is due to one or more additional factors, such as an in-person conversation between a driver and a passenger, a phone conversation between the driver and other persons, and/or the like. The emotion analysis system, in turn, removes the component of the emotional state of the driver that is due to each of these other factors. The remaining emotional state data more accurately represents the emotional state of the driver that is due to driving conditions.

System Overview

Figure 1:
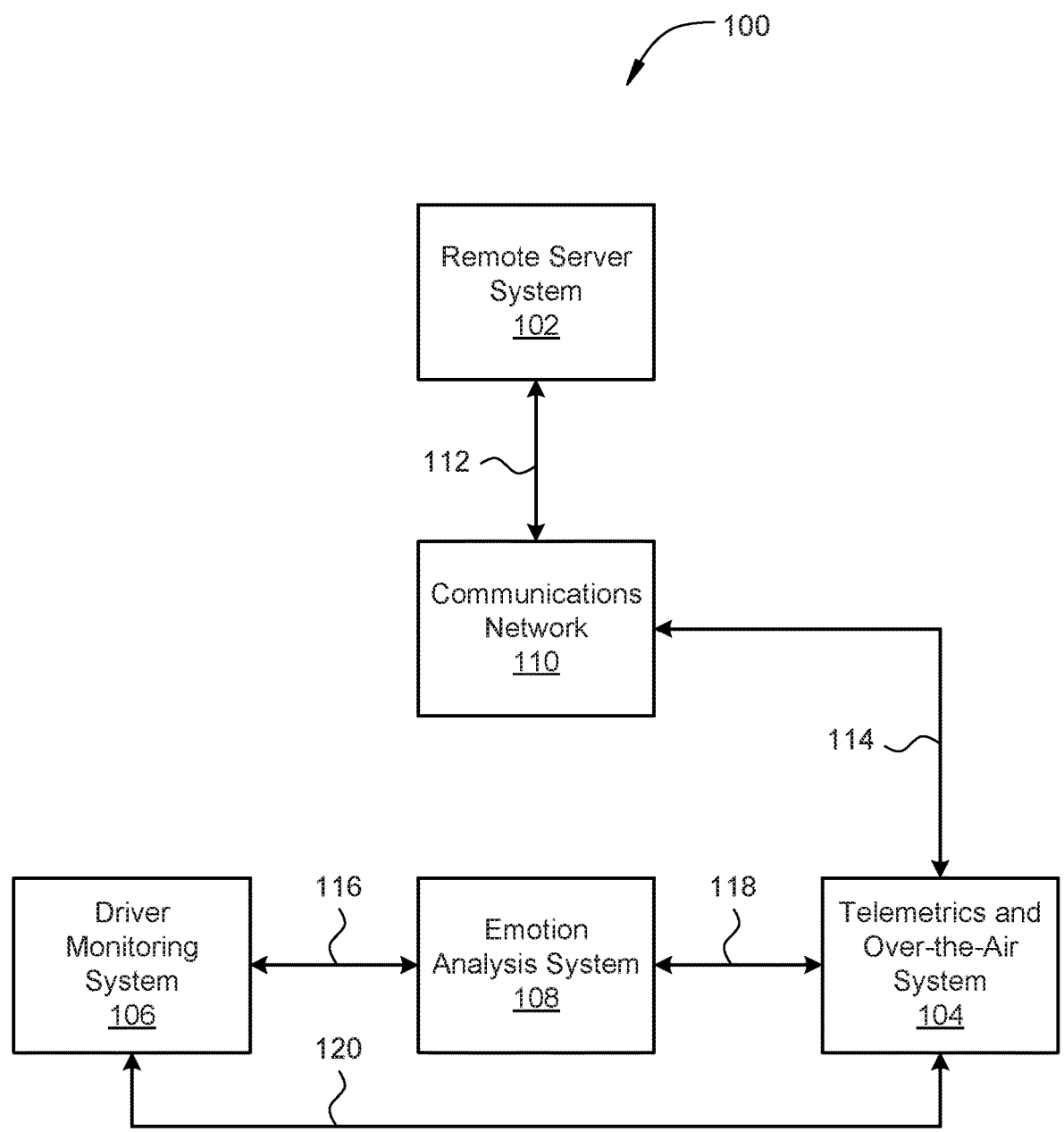
FIG. 1 illustrates a system configured to implement one or more aspects of the present disclosure.

FIG. 1 illustrates a system 100 configured to implement one or more aspects of the present disclosure. As shown, the system 100 includes, without limitation, a remote server system 102, a telemetrics and over-the-air system 104, a driver monitoring system 106, and an emotion analysis system 108. The remote server system 102 and telemetrics and over-the-air system 104 are in communication with each other via a communications network 110. Communications network 110 may be any suitable environment to enable communications among remote or local computer systems and computing devices, including, without limitation, Bluetooth communications channels, wireless and wired LANs (Local Area Networks), WANs (Wide Area Networks), cellular networks, satellite networks, high-altitude balloon networks (and other atmospheric satellite networks), peer-to-peer type networks, vehicle-to-everything (V2X) networks, and/or the like. Remote server system 102 and telemetrics and over-the-air system 104 communicate over communications network 110 via communications links 112 and 114, respectively. Further, telemetrics and over-the-air system 104 communicates with driver monitoring system 106 and emotion analysis system 108 via communications links 120 and 118, respectively. Driver monitoring system 106 communicates with emotion analysis system 108 via communications link 116. Communications links 116, 118, and 120 may employ any one or more technically feasible communications media and protocols, in any combination.

Remote server system 102 includes, without limitation, a computing device that may be a standalone server, a cluster or "farm" of servers, one or more network appliances, or any other device suitable for implementing one or more aspects of the present disclosure. Illustratively, remote server system 102 communicates over communications network 110 via communications link 112.

In operation, remote server system 102 receives emotional state data from one or more emotion analysis systems 108. In some embodiments, remote server system 102 performs one or more of the techniques described herein, in conjunction with emotion analysis systems 108. Further, remote server system 102 aggregates and analyzes the emotional state data from multiple users in a given geographic area. Based on the aggregated emotional state data, remote server system 102 may assess whether the driving conditions in a given geographic area are favorable or unfavorable. The central server system may route other drivers away from areas that are assessed as having less favorable driving conditions and towards areas that are assessed as having more favorable driving conditions. In this manner, computer-based recognition of human emotional state can improve the experience of an individual driver as well as a group of drivers in the aggregate.

Telemetrics and over-the-air system 104 includes, without limitation, a computing device that may be a standalone server, a cluster or "farm" of servers, one or more network appliances, or any other device suitable for implementing one or more aspects of the present disclosure. Illustratively, telemetrics and over-the-air system 104 communicates over communications network 110 via communications link 114. Further, telemetrics and over-the-air system 104 communicates with driver monitoring system 106 and emotion analysis system 108 via communications links 120 and 118, respectively.

In operation, telemetrics and over-the-air system 104 receives measurement data from driver monitoring system 106 and/or emotion analysis system 108. The measurement data may include information related various components of system 100, including, without limitation, sensor data, instruments, camera images, video, and/or the like. The measurement data may further include processed data, where driver monitoring system 106 and/or emotion analysis system 108 analyzes certain measurement data, such as sensor data, instruments, camera images, video, and/or the like, and generates processed data therefrom. Such processed data may include, without limitation, emotional state data. Telemetrics and over-the-air system 104 then transmits the measurement data from driver monitoring system 106 and/or emotion analysis system 108 to remote server system 102 via communications network 110.

Driver monitoring system 106 includes, without limitation, a computing device that may be a standalone server, a cluster or "farm" of servers, one or more network appliances, or any other device suitable for implementing one or more aspects of the present disclosure. Illustratively, driver monitoring system 106 communicates with telemetrics and over-the-air system 104 and emotion analysis system 108 via communications links 120 and 116, respectively.

In operation, driver monitoring system 106 monitors a driver of a vehicle to determine certain characteristics, such as the alertness state of the driver. Driver monitoring system 106 receives measurement data via various devices, including, without limitation, cameras, microphones, infrared sensors, ultrasound sensors, radar sensors, thermal imaging sensors, heartrate and breathing monitors, vehicle instrument sensors, and/or the like. By analyzing the measurement data, driver monitoring system 106 determines the overall physiological state of the driver, which may include an alertness level of the driver. If driver monitoring system 106 determines that the driver is not sufficiently alert, driver monitoring system 106 may initiate certain responsive actions, including, without limitation, flashing an interior light, sounding an alarm, applying brakes to slow or stop the vehicle safely, and/or the like. Further, driver monitoring system 106 transmits measurement data received via the various devices to emotion analysis system 108 for additional analysis, as further described herein.

Emotion analysis system 108 includes, without limitation, a computing device that may be a standalone server, a cluster or "farm" of servers, one or more network appliances, or any other device suitable for implementing one or more aspects of the present disclosure. Illustratively, emotion analysis system 108 communicates with telemetrics and over-the-air system 104 and driver monitoring system 106 via communications links 118 and 116, respectively.

In operation, emotion analysis system 108 receives measurement data from driver monitoring system 106. The measurement data is received via various devices associated with driver monitoring system 106. Emotion analysis system 108 analyzes the measurement data in order to generate processed data related to the emotional state of the driver or other user, as further described herein. Emotion analysis system 108 stores one or both of the measurement data and the processed data in a data store. In some embodiments, emotion analysis system 108 may transmit the processed data to driver monitoring system 106. Driver monitoring system 106 may then perform one or more responsive actions based in the processed data. In some embodiments, emotion analysis system 108 may transmit the one or both of the measurement data and the processed data to telemetrics and over-the-air system 104. Telemetrics and over-the-air system 104 may then transmit the measurement data and/or processed data to remote server system 102 via communications network 110.

It will be appreciated that the system shown herein is illustrative and that variations and modifications are possible. In one example, remote server system 102, telemetrics and over-the-air system 104, driver monitoring system 106, and emotion analysis system 108 are shown as communicating via certain networked and communications links. However, remote server system 102, telemetrics and over-the-air system 104, driver monitoring system 106, and emotion analysis system 108 may communicate with each other via any technically feasible networked and communications links in any technically feasible combination within the scope of this disclosure.

In another example, remote server system 102, telemetrics and over-the-air system 104, driver monitoring system 106, and emotion analysis system 108 are shown as separate systems included in the system 100 of FIG. 1. However, the techniques performed by remote server system 102, telemetrics and over-the-air system 104, driver monitoring system 106, and emotion analysis system 108 may be performed by one or more application programs or modules executing on any technically feasible processor(s) included in one or more computing devices in any technically feasible combination. Such computing devices may include, without limitation, a head unit and an auxiliary unit deployed in a vehicle. In yet another example, remote server system 102, telemetrics and over-the-air system 104, driver monitoring system 106, and emotion analysis system 108 are shown and described in the context of a vehicle based computing system that receives and processes emotional state data of a driver and/or one or more passengers. However, the techniques described herein may be deployed in any technically feasible system that receives monitors emotional state of a user, including, without limitation, a smartphone, a laptop computer, a tablet computer, a deskside computer, and/or the like. In yet another example, system 100 may include any technically feasible number of remote server systems 102, telemetrics and over-the-air systems 104, driver monitoring systems 106, and emotion analysis systems 108, in any technically feasible combination.

Operations of the Emotional State Analysis System

Figure 2:
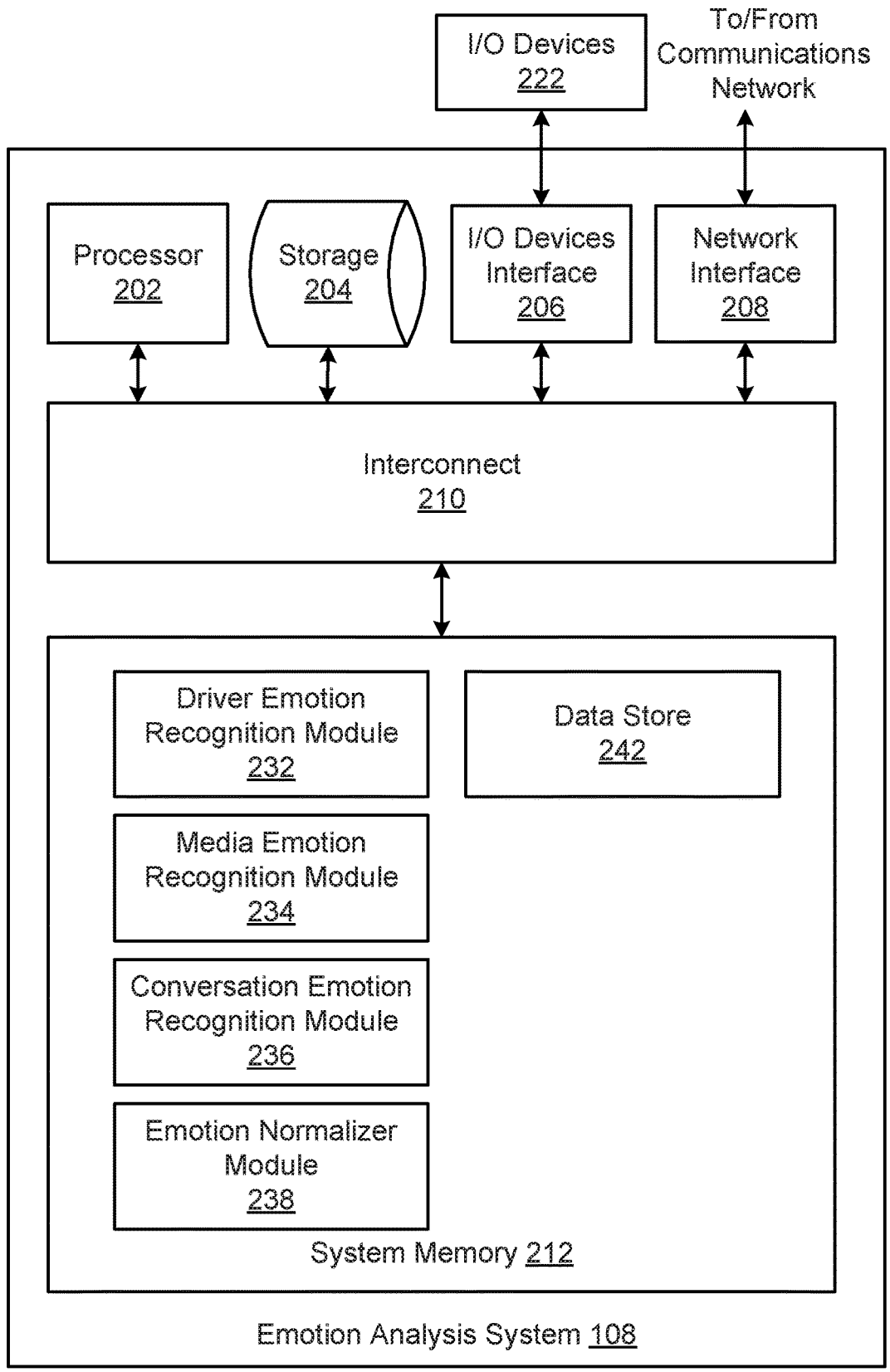
FIG. 2 is a more detailed illustration of the emotion analysis system of FIG. 1, according to various embodiments.

FIG. 2 is a more detailed illustration of the emotion analysis system 108 of FIG. 1, according to various embodiments. As shown, emotion analysis system 108 includes, without limitation, a processor 202, storage 204, an input/output (I/O) devices interface 206, a network interface 208, an interconnect 210, and a system memory 212.

The processor 202 retrieves and executes programming instructions stored in the system memory 212. Similarly, the processor 202 stores and retrieves application data residing in the system memory 212. The interconnect 210 facilitates transmission, such as of programming instructions and application data, between the processor 202, I/O devices interface 206, storage 204, network interface 208, and system memory 212. The I/O devices interface 206 is configured to receive input data from user I/O devices 222. Examples of user I/O devices 222 may include one or more buttons, a keyboard, a mouse or other pointing device, and/or the like. The I/O devices interface 206 may also include an audio output unit configured to generate an electrical audio output signal, and user I/O devices 222 may further include a speaker configured to generate an acoustic output in response to the electrical audio output signal. Another example of a user I/O device 222 is a display device that generally represents any technically feasible means for generating an image for display. For example, the display device could be a liquid crystal display (LCD) display, organic light-emitting diode (OLED) display, or digital light processing (DLP) display. The display device may be a TV that includes a broadcast or cable tuner for receiving digital or analog television signals. The display device may be included in a VR/AR headset or a heads-up display (HUD) assembly. Further, the display device may project an image onto one or more surfaces, such as walls, projection screens or a windshield of a vehicle. Additionally or alternatively, the display device may project an image directly onto the eyes of a user (e.g. via retinal projection).

Processor 202 is included to be representative of a single central processing unit (CPU), multiple CPUs, a single CPU having multiple processing cores, digital signal processors (DSPs), field-programmable gate arrays (FPGAs), graphics processing units (GPUs), tensor processing units, and/or the like. And the system memory 212 is generally included to be representative of a random access memory. The storage 204 may be a disk drive storage device. Although shown as a single unit, the storage 204 may be a combination of fixed and/or removable storage devices, such as fixed disc drives, floppy disc drives, tape drives, removable memory cards, or optical storage, network attached storage (NAS), or a storage area-network (SAN). Processor 202 communicates to other computing devices and systems via network interface 208, where network interface 208 is configured to transmit and receive data via a communications network.

The system memory 212 includes, without limitation, a driver emotion recognition module 232, a media emotion recognition module 234, a conversation emotion recognition module 236, an emotion normalizer module 238, and a data store 242. Driver emotion recognition module 232, media emotion recognition module 234, and emotion normalizer module 238 when executed by the processor 202, perform one or more operations associated with the emotion analysis system 108 of FIG. 1, as further described herein. When performing the operations associated with the emotion analysis system 108, driver emotion recognition module 232, media emotion recognition module 234, emotion normalizer module 238 may store data in and retrieve data from data store 242.

In operation, driver emotion recognition module 232 determines and classifies an emotional state of a driver based on various sensor data that receives facial features and other visual cues, voice tone and other audio cues, physiological signals, jerkiness or other motion of the steering wheel, frequent braking, and/or the like. Driver emotion recognition module 232 may classify emotional states based on a two-dimensional model or a three-dimensional model of emotional state as further described herein. Emotional states are often described qualitatively with descriptive terms such as joy, sadness, anger, and pleasure. Such descriptive terms may be difficult to analyze algorithmically. Consequently, driver emotion recognition module 232 determines numerical values along various dimensions to represent the emotional state of the driver. In a two-dimensional model, driver emotion recognition module 232 determines values for two numeric representations of emotional state. For example, driver emotion recognition module 232 may determine a first numeric value for emotional arousal and a second numeric value for emotional valence. The emotional state of a driver in a two-dimensional model may be expressed by Equation 1 below:

$$\text{Emotion}_{Driver} = f(\text{Driver}_{Valance}, \text{Driver}_{Arousal}) \quad \text{Eqn. 1}$$

In a three-dimensional model, driver emotion recognition module 232 determines values for three numeric representations of emotional state. For example, driver emotion recognition module 232 may determine a first numeric value for emotional arousal, a second numeric value for emotional valence, and a third number value for emotional dominance. Emotional dominance is also referred to herein as emotional stance. The emotional state of a driver in a three-dimensional model may be expressed by Equation 2 below:

$$\text{Emotion}_{Driver} = f(\text{Driver}_{Valance}, \text{Driver}_{Arousal}, \text{Driver}_{Dominance}) \quad \text{Eqn. 2}$$

Whether a two-dimensional model or a three-dimensional model is employed, driver emotion recognition module 232 determines the emotional state of a driver due to all relevant factors. In the following discussion, a three-dimensional model is assumed for the purpose of clarity. However, each of the techniques disclosed herein may employ a two-dimensional model a three-dimensional model, or a higher-dimensional model in any technically feasible combination.

In operation, media emotion recognition module 234 determines and classifies an emotional content of the media being accessed by a driver and/or other user due to certain factors. The emotional content of the media being accessed by the driver and/or other user may influence at least a portion of the emotional state of the driver and/or other user. Media emotion recognition module 234 may determine and classify the emotional content of the media via any technically feasible techniques, including, without limitation, algorithmic techniques and machine learning techniques. Media emotion recognition module 234 may classify emotional content based on a two-dimensional model, a three-dimensional model, or a higher-dimensional model of emotional state as further described herein.

More specifically, media emotion recognition module 234 determines the emotional content of the media content that is currently playing in the vehicle. The media content may be in any form, including, without limitation, music, news programming, talk radio, and/or the like. If, for example, the driver is listening to an amusing talk radio program, then media emotion recognition module 234 may determine that the driver is a happy, joyful, and/or excited emotional state due to the media content. If the driver is listening to loud and aggressive music, then media emotion recognition module 234 may determine that the driver is an aggressive and/or stressful emotional state due to the media content. Media emotion recognition module 234 may classify the media content via any one or more technically feasible techniques. In one example, media emotion recognition module 234 may analyze musical content acoustically to determine a typical emotional state that is represented or induced by the media content. In another example, media emotion recognition module 234 may retrieve the lyrics of a song from a music lyric database. Additionally or alternatively, media emotion recognition module 234 may perform a speech to text conversion on musical lyrics, news programming, or talk radio programming. Media emotion recognition module 234 may analyze the resulting text and determine an emotional state associated with the text. Additionally or alternatively, media emotion recognition module 234 may analyze the vocal tone of sung or spoken words to associate an emotional state based on whether the vocal tone is aggressive, soothing, and/or the like.

In yet another example, media emotion recognition module 234 may classify the media content based on previously defined classifications in the form of descriptions, labels, tags, metadata, and/or the like. Media emotion recognition module 234 maps or otherwise correlates such descriptions, labels, tags, or metadata to specific emotional states. Media emotion recognition module 234 may categorize the media content into certain types of media content and, by using heuristics, generate appropriate labels for the media content. For example, media emotion recognition module 234 may classify media content that is categorized as comedy as inducing a happy emotional state. Similarly, media emotion recognition module 234 may classify media content that is categorized as heavy metal as inducing an aggressive emotional state. Media emotion recognition module 234 converts these categories or labels into a two-dimensional model (including emotional arousal and emotional valence), a three-dimensional model (including emotional arousal, emotional valence, and emotional dominance), or a higher-dimensional model. The emotional state represented by media content in a three-dimensional model due to media content may be expressed by Equation 3 below:

$$\text{Emotion}_{Media} = f(\text{Media}_{Valance}, \text{Media}_{Arousal}, \text{Media}_{Dominance}) \quad \text{Eqn. 3}$$

In operation, emotion normalizer module 238 continuously generates emotional state data of a driver due to driving conditions by removing a component of the emotional state due to listening to media content from the overall emotional state. Emotion normalizer module 238 receives the overall emotional state of the driver from driver emotion recognition module 232. Emotion normalizer module 238 receives the emotional state of the driver due to listening to media content from media emotion recognition module 234. In response, emotion normalizer module 238 removes the component representing the emotional state of the driver due to listening to media content from the overall emotional state of the driver. Emotion normalizer module 238 removes the component via any technically feasible technique, including, without limitation, an additive/subtractive technique, a conjunctive technique, a disjunctive technique, a Bayesian model technique, and/or the like. The remaining emotional state data represents the emotional state of the driver that is due to factors other than listening to media content. As a result, the remaining emotional state data more accurately represents the emotional state of the driver that is due to driving conditions. The emotional state of a driver due to driving conditions may be expressed by Equation 4 below:

$$\text{Emotion}_{From\ Driving} = f(\text{Emotion}_{Driver}, \text{Emotion}_{Media}) \quad \text{Eqn. 4}$$

The emotional state of a driver due to driving conditions may be expressed in full form using the three-dimensional model by Equation 5 below:

$$\text{Emotion}_{From\ Driving} = f\{(\text{Driver}_{Valence}, \text{Media}_{Valence}), (\text{Driver}_{Arousal}, \text{Media}_{Arousal}), (\text{Driver}_{Dominance}, \text{Media}_{Dominance})\} \quad \text{Eqn. 5}$$

If Emotion Driver and Emotion Media have a subtractive relationship, then the emotional state of a driver due to driving conditions may be equivalently expressed by Equations 6 and 7 below $$\text{Emotion}_{From\ Driving} = \text{Emotion}_{Driver} - \text{Emotion}_{Media} \quad \text{Eqn. 6}$$

$$\text{Emotion}_{From\ Driving} = f((\text{Driver}_{Valence} - \text{Media}_{Valence}), (\text{Driver}_{Arousal} - \text{Media}_{Arousal}), (\text{Driver}_{Dominance} - \text{Media}_{Dominance})) \quad \text{Eqn. 7}$$

In some embodiments, conversation emotion recognition module 236, in conjunction with emotion normalizer module 238, may remove one or more additional components of emotional state from the overall emotional state of the driver in order to further refine the resulting emotional state. In one example, conversation emotion recognition module 236 may analyze an in-person conversation between the driver and a passenger or a phone conversation between the driver and another person. Conversation emotion recognition module 236 may perform a speech to text conversion on the words spoken by the driver. Conversation emotion recognition module 236 may analyze the resulting text and determine an emotional state associated with the text. Additionally or alternatively, conversation emotion recognition module 236 may analyze the vocal tone of the spoken words to associate an emotional state based on whether the vocal tone is aggressive, soothing, and/or the like. Similarly, conversation emotion recognition module 236 may analyze the text and vocal tone of the passenger or other person participating in the conversation. In such cases, conversation emotion recognition module 236 may apply a higher weight to the emotional state derived from the speech of the driver than to the emotional state derived from the speech of the passenger or other person. Emotion normalizer module 238 may then remove this additional component from the emotional state of the driver. The emotional state of a driver due to driving conditions may then be expressed by Equation 8 below:

$$\text{Emotion}_{From\ Driving} = f(\text{Emotion}_{Driver}, \text{Emotion}_{Media}, \text{Emotion}_{From\ Conversation}) \quad \text{Eqn. 8}$$

If $\text{Emotion}_{Driver}$, $\text{Emotion}_{Media}$, and $\text{Emotion}_{From\ Conversation}$ have a subtractive relationship, then the emotional state of a driver due to driving conditions may be equivalently expressed by Equations 9 below:

$$\text{Emotion}_{From\ Driving} = \text{Emotion}_{Driver} - \text{Emotion}_{Media} - \text{Emotion}_{From\ Conversation} \quad \text{Eqn. 9}$$

It will be appreciated that the system shown herein is illustrative and that variations and modifications are possible. In particular, the emotion analysis system 108 may not include conversation emotion recognition module 236. In such cases, the emotion analysis system 108 may not perform the functions described in conjunction with conversation emotion recognition module 236. Additionally or alternatively, one or more of the functions described in conjunction with conversation emotion recognition module 236 may be performed by one or more other modules, such as driver emotion recognition module 232, media emotion recognition module 234, emotion normalizer module 238, and/or the like.

In some embodiments, emotional state is analyzed on an emotion-by-emotion basis rather than based on a two-dimensional model or a three-dimensional model. In such embodiments, media emotion recognition module 234 and/or conversation emotion recognition module 236 may analyze happiness, anger, and/or any other relevant emotions one at a time. Emotion normalizer module 238 may then remove the components due to media content, driver conversation, and/or other components on an emotion-by-emotion basis. The resulting emotional state for happiness and anger due to driving conditions may then be expressed by Equations 10 and 11 below:

$$\text{Happiness}_{From\ Driving} = f(\text{Happiness}_{Driver}, \text{Happiness}_{Media}) \quad \text{Eqn. 10}$$

$$\text{Anger}_{From\ Driving} = f(\text{Anger}_{Driver}, \text{Anger}_{Media}) \quad \text{Eqn. 11}$$

If the elements of Equations 10 and 11 have a subtractive relationship, then the emotional state for happiness and anger due to driving conditions may be equivalently expressed by Equations 12 and 13 below:

$$\text{Happiness}_{From\ Driving} = \text{Happiness}_{Driver} - \text{Happiness}_{Media} \quad \text{Eqn. 12}$$

$$\text{Anger}_{From\ Driving} = \text{Anger}_{Driver} - \text{Anger}_{Media} \quad \text{Eqn. 13}$$

In some embodiments, media emotion recognition module 234 and/or conversation emotion recognition module 236 may generate emotional state data that is customized for a particular driver. As one example, aggressive, heavy metal music may generally cause the emotional state of a driver to become more distressed and aggressive. However, a driver who has a strong affinity for heavy metal music may experience more calm and/or pleasant emotional states when listening to such music. Similarly, calm, meditative music may generally cause the emotional state of a driver to become more calm and/or pleasant. However, a driver who has a strong dislike for meditative music may experience more agitated and/or stressful emotional states when listening to such music.

In some embodiments, media emotion recognition module 234 and/or conversation emotion recognition module 236 may track changes in emotional state due to media content, conversation, and/or other components over time.

For example, a driver may be listening to hard rock music and then changes to easy listening music. As a result, media emotion recognition module 234 may determine that the emotional state of the driver becomes more calm and less stressed as a result of the change from hard rock music to easy listening music, rather than a change in driving conditions. Similarly, a driver may be listening to easy listening music and then changes to hard rock music. As a result, media emotion recognition module 234 may determine that the emotional state of the driver becomes more agitated and stressed as a result of the change from easy listening music to hard rock music, rather than a change in driving conditions.

Various types of sensor data and associated processing are now described in further detail. The sensor data is categorized as emotion sensing, physiology sensing, behavioral sensing, acoustic sensing, and pupillometry-based cognitive workload sensing.

Emotion sensing includes detecting and classifying emotions and emotional state. Emotional sensing includes detecting discreet and known emotions such as happiness, satisfaction, anger, and frustration. Emotional sensing includes computing parametrized metrics related to emotional state, such as emotional arousal level and emotional valence level. Emotional sensing is based on data received from various types of sensors.

Sensor data may be received from psychophysiological sensors that measure various biological and physiological signals associated with a user, including, without limitation, perspiration, heartrate, breathing rate, blood flow, blood oxygen levels, galvanic skin response, temperature, sounds uttered by a user, behaviors of a user, and/or the like. Such sensor data represents various types of signals that are relevant for emotion detection. In addition, image data may be received from cameras and other imaging sensors that are configured to capture still and moving images, including, without limitation, color images, black and white images, thermal images, infrared images, and/or the like. Such cameras and imaging sensors capture a facial expression of a user or other images of the body position and/or contortions of the user that may be indicative of emotion. In some embodiments, images may be received from an array of cameras or imaging sensors in order to simultaneously capture multiple perspectives of the body and head of the user. Further, in some embodiments, images may be received from a depth camera or imaging sensor in order to sense body posture and body positioning.

Physiology sensing includes detection systems that capture various physiological signals that are correlated with emotional states. Signals received from such sensors correlate with certain emotional states, and, therefore, are relevant to emotion classification. For example, galvanic skin response may be indicative of the intensity of emotional state. Physiology sensors may include, without limitation, galvanic skin response sensors to measure change in the electrical resistance of the skin caused by emotional stress, imagers to detect blood oxygen levels, thermal sensors to detect blood flow, optical sensors to detect blood flow, EEG systems to detect surface potentials of the brain, EOG sensors (electrooculography sensors that measure eye movements by monitoring the electrical potential between the front and back of the human eye), EMG sensors (electromyography sensors that measure electrical activity in response to a stimulation of muscles by a nerve), ECG sensors (electrocardiography sensors that measure the electrical activity of the heart), high-frequency radio sensors such as GHz band radios to measure heartrate and breathing rate, neural systems to detect the neural correlates of emotion, and/or the like.

Acoustic sensing includes analyzing the words spoken by a user, as well as how a user speaks a given phrase, which are indicative of sentiment emotion. Acoustic sensing further includes non-speech human sounds emitted by a user, including, without limitation, whistling, humming, laughing, or screaming, which may be indicative of the emotional state of the user. In one example, natural language processing methods, sentiment analysis, and/or speech analysis could measure emotion via the semantic meaning of language. In another example, voice tone analysis could detect emotion from the actual speech signal. Both methods could be used singly or in combination. Typical acoustic sensors data include, without limitation, a microphone, a microphone array, and/or other audio sensing technologies.

Behavioral sensing includes detecting activities of a user in and around the vehicle. Some of the sensors further described herein may be employed to detect movement in and around the vehicle. Application and service usage data may also indicate a behavior of a user and infer emotion through a classification system. In one example, mobile usage data could indicate a pattern of application usage by the user that correlates with certain emotional states. If an application is categorized as a game application or a social application, executing such an application could be correlated with joy, happiness, and/or related social emotions. Behavioral sensors may further include, without limitation, cameras, imaging sensor, auditory sensors, depth cameras, pressure sensors, and/or the like. These sensors register a body position of a user, movements, and other behaviors in and around the vehicle. Such body position, movement, and/or behavior data could be correlated with emotions such as boredom, fatigue, and arousal. Behavioral sensors may further include, without limitation, touch sensors, acoustic sensors, registrations of button presses or other user interface interactions that determine how a user is behaving in the vehicle, and/or the like. Such sensor data may indicate which systems a user is accessing and where the user is placing his or her hands at any given time.

Pupillometry-based cognitive workload sensing measure minute fluctuations in a pupil diameter of a user. Such minute fluctuations have been scientifically linked to the cognitive workload a user is experiencing from moment to moment. Other related techniques may be employed to measure cognitive workload. Sensors that enable measurement of cognitive workload include, without limitation, cameras and imaging sensors that image a pupil of a user in order to measure the change in pupil diameter and/or eye motions. Such cameras and imaging sensors include, without limitation, infrared cameras, thermal sensors, high-resolution color or black and white cameras, camera arrays that capture multiple perspectives of the body and head of the user, and/or the like. Physiological sensors include, without limitation, galvanic skin response sensors, heartrate sensors, skin temperature sensors, and/or the like that measure cognitive workload at relatively low resolution. In some embodiments, EEG and other neural interfaces may detect multiple cognitive workload levels. Methods related to measuring cognitive workload from EEG and other neural data include spectral entropy, weighted mean frequency, bandwidth, spectral edge frequency, and/or the like. In some embodiments, speech analysis may be employed for cognitive workload sensing. In particular, spectral centroid frequency and amplitude, with some parameter fitting for filter length and filter number may successfully classify various cognitive workload levels.

In some embodiments, driver emotion recognition module 232, media emotion recognition module 234, and/or emotion normalizer module 238 may partition sensor data and processed data into several levels, where each level is associated with a different degree of abstraction. A first data level may include raw sensor data, including, without limitation, data from cameras, microphones, infrared sensors, and vehicle instrument sensors. A second data level may include, without limitation, biological data associated with the user, including, without limitation, heartrate, temperature, perspiration, head position, face position, pupil diameter data, and direction of eye gaze.

A third data level may include processed data that represents various higher states of the user, including, without limitation, emotional state. The emotional state data indicates how the user feels. The emotional state data may be divided into emotional arousal data and emotional valence data. The emotional arousal data represents the degree of the emotional state experienced by user. The emotional valence data indicates whether the emotional state is associated with positive emotions, such as happiness and satisfaction, or with negative emotions, such as anger and frustration.

In one particular example, a user is driving on the freeway and heading home on a beautiful day with a very calm and scenic environment. The user is listening to heavy metal music on the media player of a vehicle. Driver emotion recognition module 232 detects that the user is in an agitated, aggressive state. Media emotion recognition module 234 detects an agitated, aggressive state that is due to the driver listening to heavy metal music. Emotion normalizer module 238 removes the agitated, aggressive component of the emotional state due to the heavy metal music content from the overall emotional state of the driver. Emotion normalizer module 238 determines that the resulting emotional state is more calm and non-stressful. Consequently, emotion normalizer module 238 does not perform any responsive action.

In another particular example, a user is driving in a busy urban area in heavy rain and sleet. The user is listening to a meditation instruction book-on-tape. Driver emotion recognition module 232 detects that the emotional state of the user is extremely relaxed and almost sleepy. Media emotion recognition module 234 analyzes the media content that the user is listening to and determines that much of the calmness of the user is due to the calm media content. Emotion normalizer module 238 removes the calm component of the emotional state due to the meditation-related media content from the overall emotional state of the driver. Emotion normalizer module 238 determines that the resulting emotional state due to driving conditions indicates stressful driving conditions. Consequently, emotion normalizer module 238 may perform one or more responsive actions.

In yet another particular example, after emotion normalizer module 238 determines the emotional state of a user due to driving conditions, emotion normalizer module 238 transmits this emotional state data to telemetrics and over-the-air system 104. Telemetrics and over-the-air system 104, in turn, transmits this emotional state data to remote server system 102. Remote server system 102 receives emotional state data from various emotion analysis systems 108 in a particular geographic area. Remote server system 102 generates a heat map of the geographic area that shows the happiness, stress, and/or other emotional state of each driver in the area. Remote server system 102 may aggregate the emotional state of each driver in the geographic area over time and/or over a group of drivers. Remote server system 102 then transmits the heat map data to one or more emotion analysis systems 108. The driver of a particular vehicle that has received the heat map data may then choose a route through the area where the driving conditions result in more drivers that have a happy emotional state and/or fewer drivers that have a stressed emotional state.

Figure 3A:
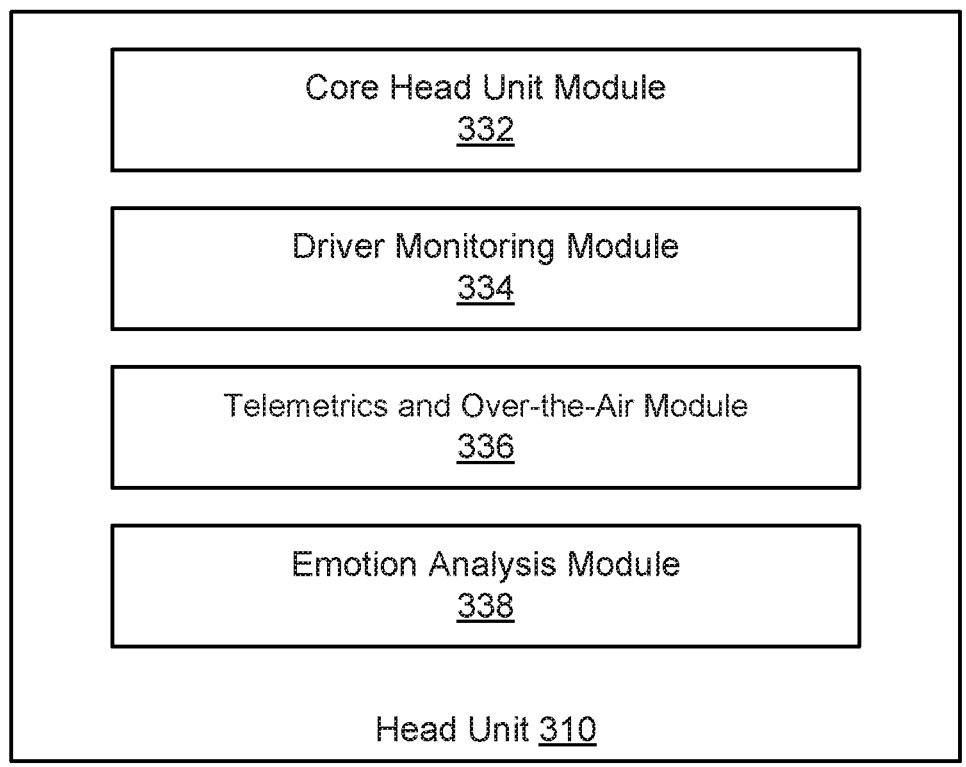
FIGS. 3A-3C are conceptual diagrams that illustrate various configurations of the system of FIG. 1, according to various embodiments.
Figure 3B:
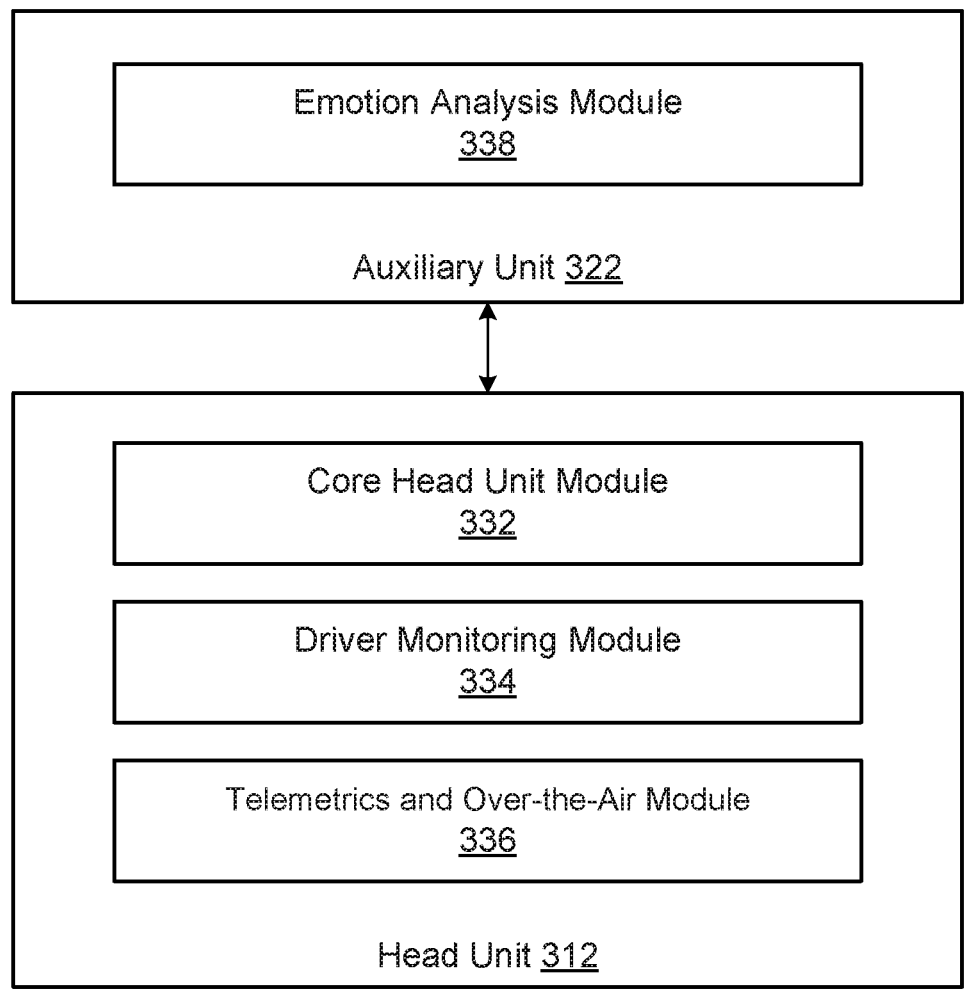
Figure 3C:
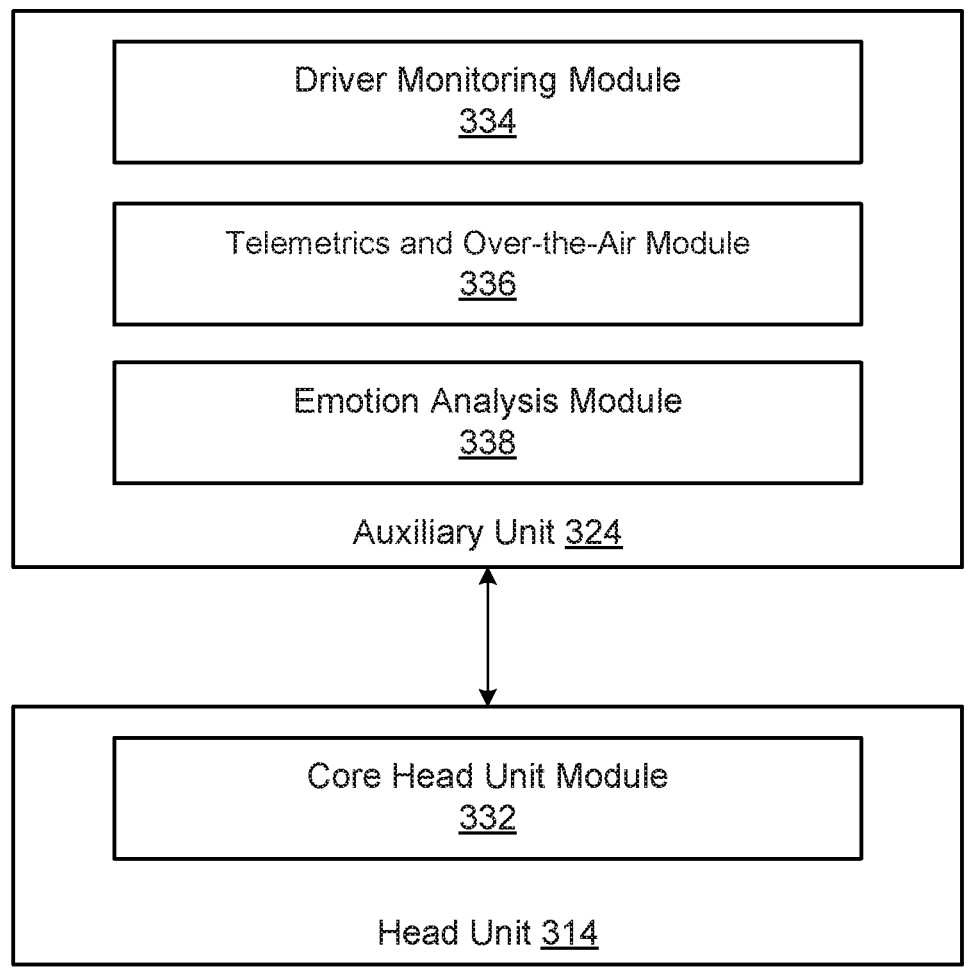

FIGS. 3A-3C are conceptual diagrams that illustrate various configurations of the system of FIG. 1, according to various embodiments.

As shown in FIG. 3A, a head unit 310 includes a core head unit module 332, a driver monitoring module 334, a telemetrics and over-the-air module 336, and an emotion analysis module 338. Head unit 310 includes a computing device with sufficient processing and memory resources associated with core head unit module 332, driver monitoring module 334, telemetrics and over-the-air module 336, and emotion analysis module 338. Core head unit module 332 performs various functions associated with the operation of a vehicle, including, without limitation, entertainment and media functions, navigation, and vehicle monitoring. Vehicle monitoring includes monitoring and display functions related to tire pressure, oil level, coolant temperature, vehicle maintenance, and so on.

Driver monitoring module 334 performs various functions associated with the driver monitoring system 106 of FIG. 1. These functions include, without limitation, monitoring a driver of a vehicle to determine the alertness state of the driver, and/or transmitting measurement data received via various devices to emotion analysis module 338 for additional analysis.

Telemetrics and over-the-air module 336 performs various functions associated with the telemetrics and over-the-air system 104 of FIG. 1. These functions include, without limitation, receiving measurement data from driver monitoring system 106 and/or emotion analysis system 108, transmitting the measurement data to remote server system 102, receiving data from remote server 102, forwarding data received from remote server 102 to driver monitoring system 106 and/or emotion analysis system 108, and/or the like.

Emotion analysis module 338 performs various functions associated with the emotion analysis system 108 of FIG. 1. These functions include, without limitation, receiving measurement data received via various devices from driver monitoring module 334, analyzing the measurement data in order to generate processed data related to the emotional state of the driver or other user, and/or storing one or both of the measurement data and processed data. In some embodiments, emotion analysis module 338 may transmit the one or both of the measurement data and the processed data to telemetrics and over-the-air module 336. Telemetrics and over-the-air module 336 may then transmit the measurement data and/or processed data to remote server system 102 via communications network 110.

In some embodiments, a head unit may not have sufficient processor and memory resources to execute all of core head unit module 332, driver monitoring module 334, telemetrics and over-the-air module 336, and emotion analysis module 338. Consequently, one or more of these modules may be executed on a computing device associated with one or more auxiliary units. Such auxiliary units could include an internal computing device along with local and/or remote connectivity to one or more communications channels. One exemplary auxiliary unit could be a "dongle" inserted into a port of a vehicle, such as an on-board diagnostics 2 (OBD2) port, where a dongle is a small device that may be connected to and in communication with another device, such as the head unit. Another exemplary auxiliary unit could be a unit embedded into a dash panel of a vehicle, underneath a driver seat or passenger seat of the vehicle, or elsewhere in the vehicle. Yet another exemplary auxiliary unit could be a smartphone or other mobile device executing an application that communicates with another device, such as the head unit, over one or more wired or wireless communications channels. Any such auxiliary unit may include a computing device that, when executing instructions, may perform any one or more techniques described herein. Further, any such auxiliary unit may include a wired and/or wireless network interface to communicate with one or more local and/or remote devices.

As shown in FIG. 3B, a head unit 312 includes a core head unit module 332, a driver monitoring module 334, and a telemetrics and over-the-air module 336. Head unit 312 includes a computing device with sufficient processing and memory resources associated with core head unit module 332, driver monitoring module 334, and telemetrics and over-the-air module 336. Head unit 312 communicates with an auxiliary unit 322 that includes an emotion analysis module 338. Auxiliary unit 322 includes a computing device with sufficient processing and memory resources associated with emotion analysis module 338.

In some embodiments, a legacy head unit may only include the functions associated with core head unit module 332. In such embodiments, the remaining functions may be executed on a computing device associated with one or more auxiliary units.

As shown in FIG. 3C, a head unit 314 includes a core head unit module 332. Head unit 312 includes a computing device with sufficient processing and memory resources associated with core head unit module 332. Head unit 312 communicates with an auxiliary unit 322 that includes a driver monitoring module 334, and a telemetrics and over-the-air module 336, and an emotion analysis module 338. Auxiliary unit 322 includes a computing device with sufficient processing and memory resources associated with driver monitoring module 334, and telemetrics and over-the-air module 336, emotion analysis module 338.

Although specific configurations are shown in FIGS. 3A-3C, the functions associated with core head unit module 332, driver monitoring module 334, telemetrics and over-the-air module 336, and emotion analysis module 338 may be executed on any one or more computing devices in any technically feasible combination and configuration within the scope of the present disclosure.

Figure 4A:
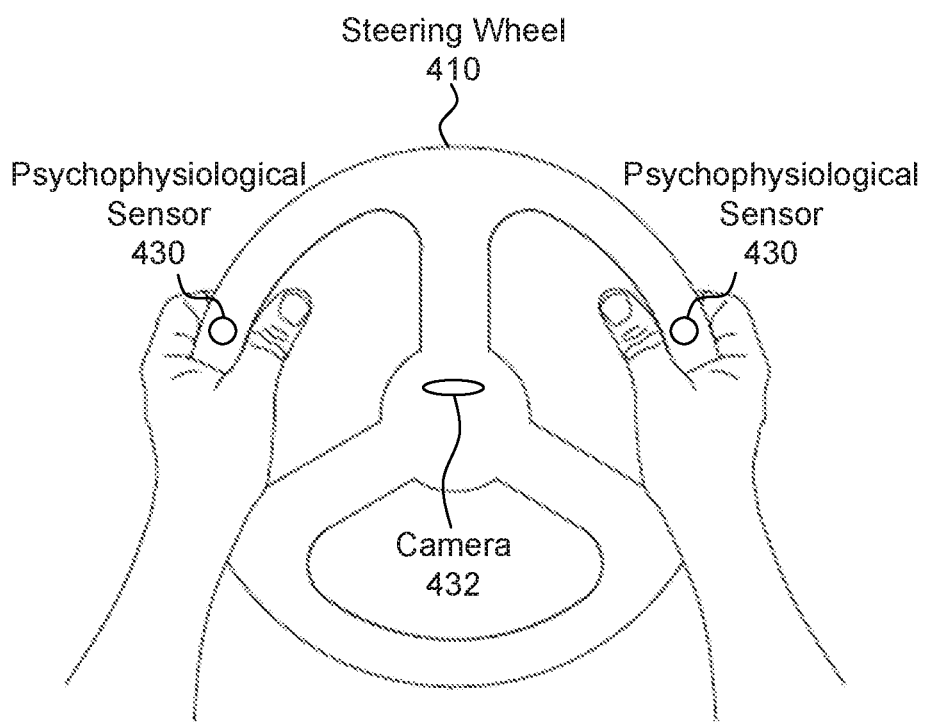
FIGS. 4A-4B illustrate example arrangements of sensors associated with the system of FIG. 1, according to various embodiments.
Figure 4B:
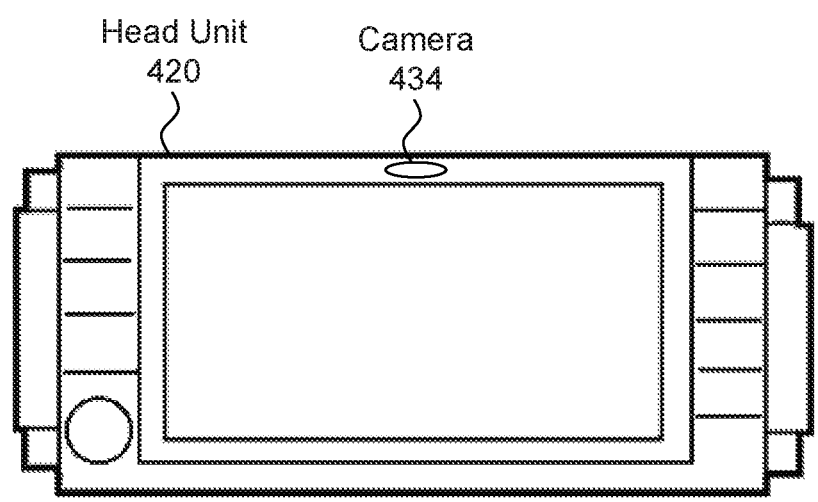

FIGS. 4A-4B illustrate example arrangements of sensors associated with the system of FIG. 1, according to various embodiments. As shown in FIG. 4A, a steering wheel 410 fitted with psychophysiological sensors 430 and a camera 432. The psychophysiological sensors 430 may be configured to measure any technically feasible psychophysiological data via contact with the hands of the user, including, without limitation, heartrate, temperature, and perspiration data. The camera 432 may capture still or moving images. The captured images may include any technically feasible image data, including, without limitation, color images, black and white images, thermal images, and infrared images. The psychophysiological sensors 430 and the camera 432 may transmit psychophysiological data and images to one or both of driver monitoring system 106 and emotion analysis system 108. Also shown in FIG. 4B is a head unit 420 fitted with a camera 434. The camera 434 may capture still or moving images. The captured images may include any technically feasible image data, including, without limitation, color images, black and white images, thermal images, and infrared images. The camera 434 may transmit images to one or both of driver monitoring system 106 and emotion analysis system 108. It will be appreciated that the system shown herein is illustrative and that variations and modifications are possible. In particular, various sensors, including psychophysiological sensors 430 and cameras 432 and 434, may be placed in any technologically feasible location, such as on the surface of the vehicle dashboard, integrated into the instrument cluster of the vehicle, hidden inside a display unit of the vehicle, under the rearview mirror of the vehicle, and/or the like.

Figure 5A:
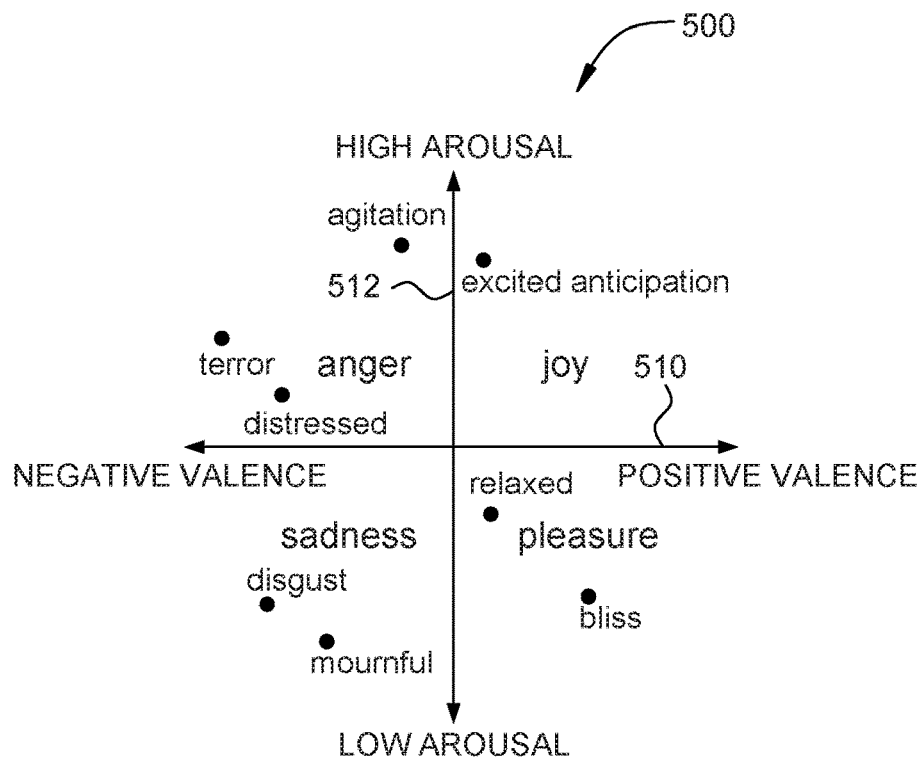
FIGS. 5A-5B illustrate example models for mapping emotional state along various dimensions, according to various embodiments.
Figure 5B:
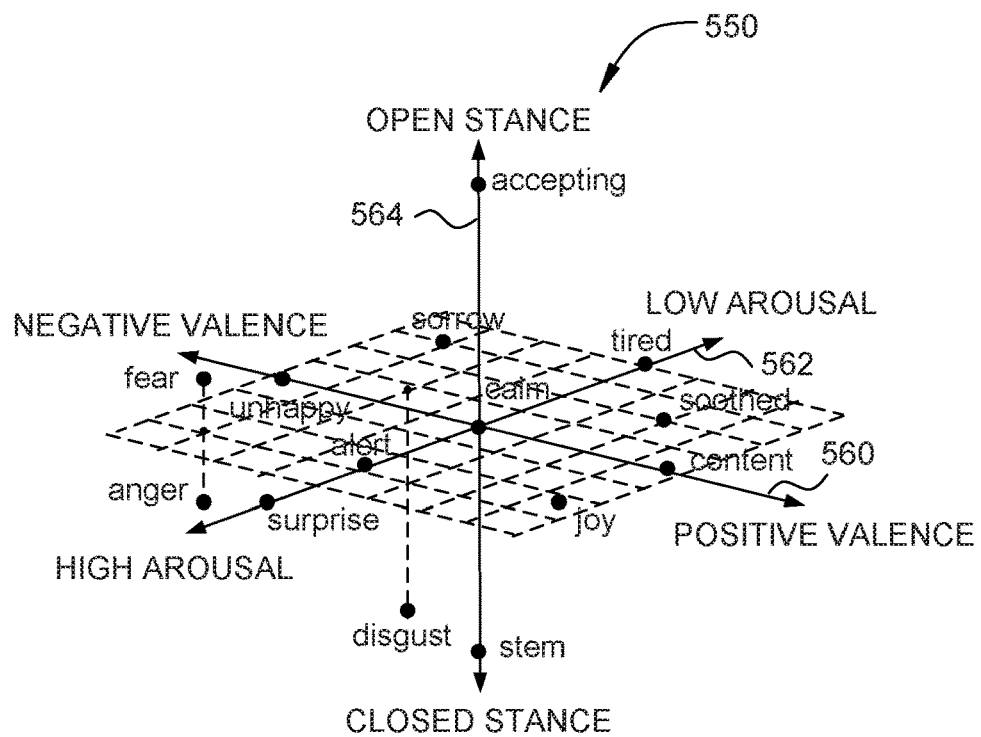

FIGS. 5A-5B illustrate example models for mapping emotional state along various dimensions, according to various embodiments. As shown in FIG. 5A, a two-dimensional model 500 maps emotional states along two dimensions, an emotional valence dimension 510 and an emotional arousal dimension 512.

The emotional valence dimension 510 is a measure of how pleasant or unpleasant a user feels. For example, anger and sadness represent unpleasant emotions. Therefore, anger and sadness are placed within the negative valence region of the two-dimensional model 500. On the other hand, joy and/or pleasure represent positive emotions. Therefore, joy and pleasure are placed in the positive valence region of the two-dimensional model 500.

The emotional arousal dimension 512 measures how energized or soporific a user feels, rather than the intensity of the emotion. In that vein, sadness and pleasure represent low arousal feelings and, therefore, are placed in the low arousal region of the two-dimensional model 500. Anger and joy represent high arousal feelings and, therefore, are placed in the high arousal region of the two-dimensional model 500.

As shown in FIG. 5B, a three-dimensional model 550 maps emotional states along three dimensions, an emotional valence dimension 560, an emotional arousal dimension 562, and an emotional dominance dimension 564, also referred to herein as an emotional stance dimension. The emotional valence dimension 560 is a measure of how pleasant or unpleasant a user feels and is analogous to the emotional valence dimension 510 of FIG. 5A. The emotional arousal dimension 562 measures how energized or soporific a user feels and is analogous to the emotional arousal dimension 512 of FIG. 5A.

The emotional dominance dimension 564 represents the emotional state of the user with respect to dominance, control, or stance. A closed stance represents an emotional state of dominance or control. An open stance represents an emotional state of submissiveness or being controlled.

In that vein, disgust and anger represent closed stance or dominant feelings and, therefore, are placed in the closed stance region of the three-dimensional model 550. Acceptance and fear represent open stance or submissive feelings and, therefore, are placed in the open stance region of the three-dimensional model 550.

When measuring the overall emotional state of the driver, driver emotion recognition module 232 may employ the two-dimensional model 500 of FIG. 5A or the three-dimensional model 550 of FIG. 5B. Similarly, when measuring specific components of the emotional state of the driver due to media content or other factors, media emotion recognition module 234 may employ the two-dimensional model 500 of FIG. 5A or the three-dimensional model 550 of FIG. 5B.

Figure 6:
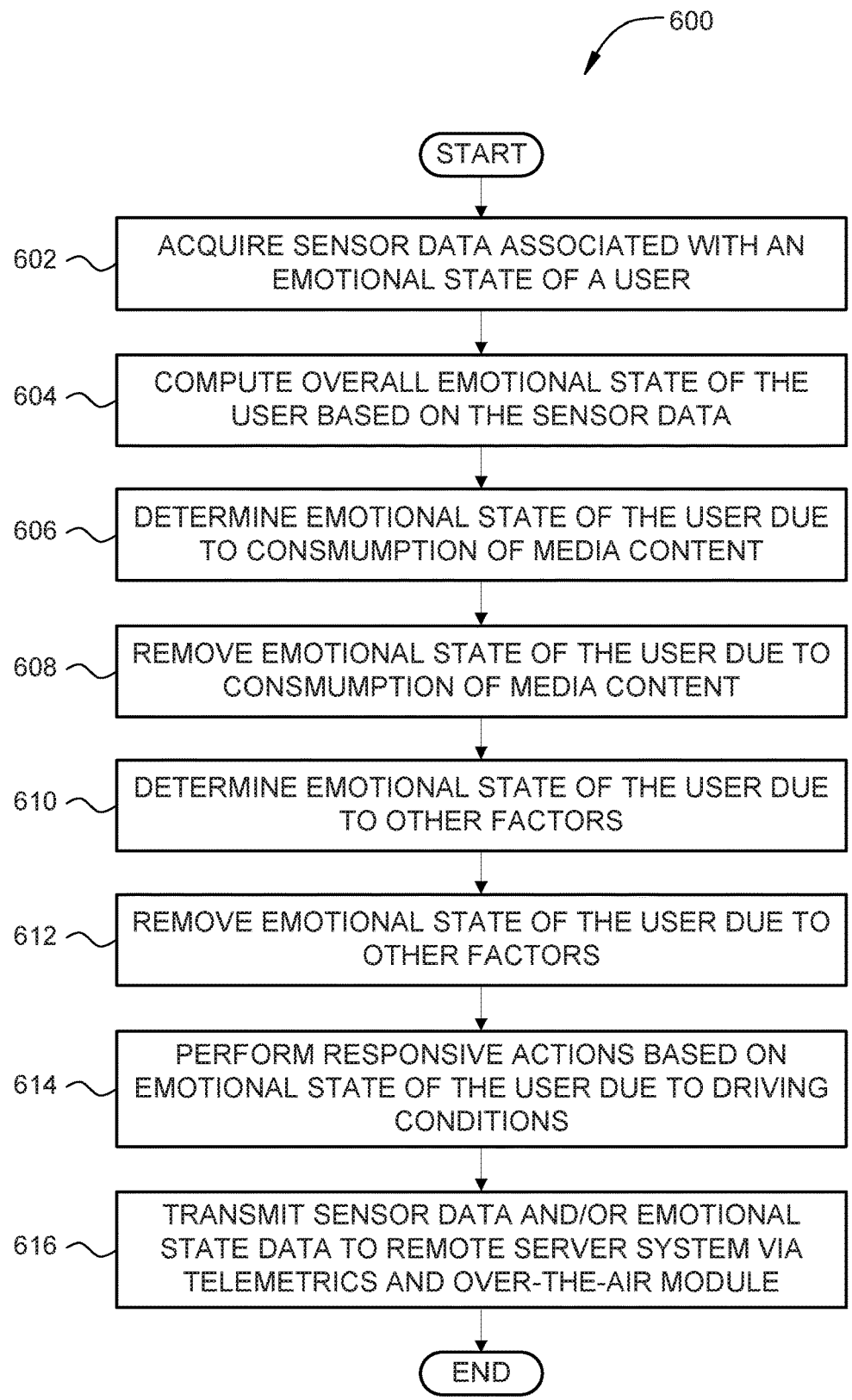
FIG. 6 is a flow diagram of method steps for computing and analyzing emotional state of a user, according to various embodiments.

FIG. 6 is a flow diagram of method steps for computing and analyzing emotional state of a user, according to various embodiments. Although the method steps are described in conjunction with the systems of FIGS. 1-5, persons skilled in the art will understand that any system configured to perform the method steps, in any order, is within the scope of the present disclosure.

As shown, a method 600 begins at step 602, where driver emotion recognition module 232 executing on emotion analysis system 108 acquires sensor data associated with an emotional state of a user. The sensor data may be raw sensor data that includes, without limitation, data from cameras, microphones, infrared sensors, vehicle instrument sensors, and/or the like. Additionally or alternatively, the sensor data may include, without limitation, biological data associated with the user, including, without limitation, heartrate, temperature, perspiration, head position, face position, pupil diameter data, direction of eye gaze, and/or the like.

At step 604, driver emotion recognition module 232 determines an overall emotional state of the user based on the sensor data. Driver emotion recognition module 232 may determine an overall emotional state of the user based on a two-dimensional model. In such cases, driver emotion recognition module 232 may determine a first numeric value for emotional arousal and a second numeric value for emotional valence. Alternatively, driver emotion recognition module 232 may determine an overall emotional state of the user based on a three-dimensional model. In such cases, driver emotion recognition module 232 may determine a first numeric value for emotional arousal, a second numeric value for emotional valence, and a third numeric value for emotional dominance. Alternatively, driver emotion recognition module 232 may determine an overall emotional state of the user based on a higher-dimensional model. Alternatively, driver emotion recognition module 232 may determine an overall emotional state of the user based on an emotion-by-emotion basis. In such cases, driver emotion recognition module 232 may determine an overall emotional state for each of a set of specified emotions.

At step 606, media emotion recognition module 234 executing on emotion analysis system 108 determines an emotional state of the user due to listening to media content. In general, media emotion recognition module 234 employs the same two-dimensional model, three-dimensional model, higher-dimensional model, or emotion-by-emotion analysis employed by driver emotion recognition module 232.

At step 608, emotion normalizer module 238 executing on emotion analysis system 108 removes emotional state of the user due to listening to media content from the overall emotional state of the user. As a result, the remaining emotional state data represents the emotional state of the driver that is due to factors other than the listening to media content. In that regard, the remaining emotional state data more accurately represents the emotional state of the driver that is due to driving conditions.

At step 610, conversation emotion recognition module 236 executing on emotion analysis system 108 determines an emotional state of the user due to other factors. Such other factors may include, without limitation, an in-person conversation between a driver and a passenger, a phone conversation between the driver and other persons, and/or the like. In general, conversation emotion recognition module 236 employs the same two-dimensional model, three-dimensional model, higher-dimensional model, or emotion-by-emotion analysis employed by driver emotion recognition module 232 and/or media emotion recognition module 234.

At step 612, emotion normalizer module 238 removes emotional state of the user due to these other factors. As a result, the remaining emotional state data represents the emotional state of the driver that is due to factors other than listening to media content, driver conversation, and/or the like. In that regard, the remaining emotional state data even more accurately represents the emotional state of the driver that is due to driving conditions.

At step 614, emotion normalizer module 238 performs one or more responsive actions based on the emotional state of the user after removal of the components related to listening to media content, driver conversation, and/or the like. As a result, the remaining emotional state of the user after such removal is entirely or mainly due to driving conditions, although some additional residual factors may continue to be present in the emotional state. These responsive actions may include, without limitation, presenting suggestions and/or alerts to the driver in textual form, presenting suggestions and/or alerts to the driver in audio form, and/or the like.

At step 616, emotion normalizer module 238 transmits sensor data and/or emotional state data to remote server 102 via telemetrics and over-the-air system 104. In response, remote server system 102 aggregates and analyzes the emotional state data received from emotion recognition systems 108 associated with multiple users in a given geographic area. Based on the aggregated emotional state data, remote server system 102 may assess whether the driving conditions in a given geographic area are favorable or unfavorable. The central server system may route other drivers away from areas that are assessed as having less favorable driving conditions and towards areas that are assessed as having more favorable driving conditions. In this manner, computer-based recognition of human emotional state can improve the experience of an individual driver as well as a group of drivers in the aggregate. The method 600 then terminates.

In sum, an emotion analysis system assesses the emotional state of a user due to various input conditions. More specifically, the emotion analysis system analyzes sensor data to determine an overall emotional state of a driver. The emotion analysis system determines an emotional state of the driver that results from the driver listening to particular media content. The emotion analysis system applies a function to remove the component of the emotional state resulting from listening to the particular media content from the overall emotional state. Optionally, the emotion analysis system determines an emotional state of the driver that results from additional factors, such as an in-person conversation between a driver and a passenger or a phone conversation between the driver and other persons, and/or the like. The emotion analysis system applies one or more additional functions to remove the component of the emotional state resulting from these additional secondary effects from the overall emotional state. The resulting emotional state more accurately reflects the emotional state of the driver due to current driving conditions. The emotion analysis system performs one or more responsive actions based on the emotional state of the user due to driving conditions. The responsive actions may include presenting suggestions and/or alerts to the driver in textual, or audio, or other forms, such as indicators, lights, haptic outputs, and/or the like. Further, the emotion analysis system may transmit the sensor data and/or the emotional state data to a remote server system. The remote server system aggregates and analyzes sensor data and/or the emotional state data received from multiple emotion analysis systems to assess overall emotional states of multiple drivers due to the driving conditions.

At least one technical advantage of the disclosed techniques relative to the prior art is that data associated with the emotional state of a driver can be processed to more accurately separate the contributions to the emotional state of the driver due to driving conditions from the overall emotional state of the driver by removing contributions to the emotional state of the driver due to media content and/or other factors. As a result, a DMS may generate more appropriate responsive actions to the driver in response to the contributions of driving conditions to the emotional state of the driver. Another technical advantage of the disclosed techniques is that a central server system, that aggregates emotional state data from multiple drivers, may use the more accurate assessments of the contributions of driving conditions to the emotional states of the drivers to generate more accurate assessments of the overall favorability or unfavorability of the driving conditions in a particular area. These technical advantages represent one or more technological improvements over prior art approaches.

1. In some embodiments, a computer-implemented method for computing and analyzing emotional state of a user comprises: acquiring, via at least one sensor, sensor data associated with a user; determining, based on the sensor data, an emotional state associated with a user; determining a first component of the emotional state that corresponds to media content being accessed by the user; and applying a first function to the emotional state to remove the first component from the emotional state.

2. The computer-implemented method according to clause 1, further comprising: determining a second component of the emotional state based on a factor associated with the user; and applying a second function to the emotional state to remove the second component from the emotional state.

3. The computer-implemented method according to clause 1 or clause 2, wherein the factor is associated with an in-person conversation between the user and another person.

4. The computer-implemented method according to any of clauses 1-3, wherein the factor is associated with a phone conversation between the user and another person.

5. The computer-implemented method according to any of clauses 1-4, wherein the media content comprises musical content, and wherein determining the first component of the emotional state comprises: analyzing the musical content to determine the first component.

6. The computer-implemented method according to any of clauses 1-5, wherein the media content comprises musical content, and wherein determining the first component of the emotional state comprises: retrieving the first component from a database.

7. The computer-implemented method according to any of clauses 1-6, wherein the media content comprises vocal content, and wherein determining the first component of the emotional state comprises: analyzing the vocal content to determine the first component based on at least one of a vocal tone or a text segment in the vocal content.

8. The computer-implemented method according to any of clauses 1-7, wherein the emotional state comprises an emotional valence value and an emotional arousal value, and wherein applying the first function to the emotional state comprises: applying the first function to the emotional valence value to remove a first component of the emotional valence value that corresponds to the media content being accessed by the user; and applying the first function to the emotional arousal value to remove a first component of the emotional arousal value that corresponds to the media content being accessed by the user.

9. The computer-implemented method according to any of clauses 1-8, wherein the emotional state further comprises an emotional dominance value, and wherein applying the first function to the emotional state comprises: applying the first function to the emotional dominance value to remove a first component of the emotional dominance value that corresponds to the media content being accessed by the user.

10. The computer-implemented method according to any of clauses 1-9, wherein the emotional state comprises a first emotion and a second emotion, and wherein applying the first function to the emotional state comprises: applying the first function to the first emotion to remove a first component of the first emotion that corresponds to the media content being accessed by the user; and applying the first function to the second emotion to remove a second component of the second emotion that corresponds to the media content being accessed by the user.

11. In some embodiments, one or more computer-readable storage media include instructions that, when executed by one or more processors, cause the one or more processors to compute and analyze emotional state of a user, by performing the steps of: acquiring, via at least one sensor, sensor data associated with a user; determining, based on the sensor data, an emotional state associated with a user; determining a first component of the emotional state that corresponds to media content being accessed by the user; and applying a first function to the emotional state to remove the first component from the emotional state.

12. The computer-implemented method according to clause 11, wherein the instructions further cause the one or more processors to perform the steps of: determining a second component of the emotional state based on a factor associated with the user; and applying a second function to the emotional state to remove the second component from the emotional state.

13. The computer-implemented method according to clause 11 or clause 12, wherein the factor is associated with an in-person conversation between the user and another person.

14. The computer-implemented method according to any of clauses 11-13, wherein the factor is associated with a phone conversation between the user and another person.

15. The computer-implemented method according to any of clauses 11-14, wherein the media content comprises musical content, and wherein determining the first component of the emotional state comprises: analyzing the musical content to determine the first component.

16. The computer-implemented method according to any of clauses 11-15, wherein the media content comprises musical content, and wherein determining the first component of the emotional state comprises: retrieving the first component from a database.

17. The computer-implemented method according to any of clauses 11-16, wherein the media content comprises vocal content, and wherein determining the first component of the emotional state comprises: analyzing the vocal content to determine the first component based on at least one of a vocal tone or a text segment in the vocal content.

18. The computer-implemented method according to any of clauses 11-17, wherein the emotional state comprises an emotional valence value and an emotional arousal value, and wherein applying the first function to the emotional state comprises: applying the first function to the emotional valence value to remove a first component of the emotional valence value that corresponds to the media content being accessed by the user; and applying the first function to the emotional arousal value to remove a first component of the emotional arousal value that corresponds to the media content being accessed by the user.

19. The computer-implemented method according to any of clauses 11-18, wherein the emotional state further comprises an emotional dominance value, and wherein applying the first function to the emotional state comprises: applying the first function to the emotional dominance value to remove a first component of the emotional dominance value that corresponds to the media content being accessed by the user.

20. In some embodiments, a first endpoint device comprises: a memory that includes instructions; and a processor that is coupled to the memory and, when executing the instructions: acquires, via at least one sensor, sensor data associated with a user; determines, based on the sensor data, an emotional state associated with a user; determines a first component of the emotional state that corresponds to media content being accessed by the user; and applies a first function to the emotional state to remove the first component from the emotional state.

Any and all combinations of any of the claim elements recited in any of the claims and/or any elements described in this application, in any fashion, fall within the contemplated scope of the present disclosure and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for computing and analyzing emotional state of a user, the method comprising:
   acquiring, via at least one sensor, sensor data associated with a user;
   determining, based on the sensor data, an initial emotional state associated with the user;
   determining an emotional content of media being listened to or consumed by the user;
   determining an emotional contribution factor to the initial emotional state of the user due to the emotional content of the media; and
   determining an updated emotional state associated with the user by removing the emotional contribution factor from the initial emotional state using an additive technique, a subtractive technique, a conjunctive technique, a disjunctive technique, or a Bayesian model technique.

2. The computer-implemented method of claim 1, further comprising the steps of:
   determining a second contribution factor to the initial emotional state based on a factor associated with the user; and
   removing the second contribution factor from the initial emotional state.

3. The computer-implemented method of claim 2, wherein the factor is associated with one of,
   an in-person conversation between the user and another person, or a phone conversation between the user and another person.

4. The computer-implemented method of claim 1, wherein the media comprises musical content, and wherein determining the emotional contribution factor comprises analyzing the musical content to determine the emotional contribution factor.

5. The computer-implemented method of claim 1, wherein the media comprises musical content, and wherein determining the emotional contribution factor comprises retrieving the emotional contribution factor from a database.

6. The computer-implemented method of claim 1, wherein the media comprises vocal content, and wherein determining the emotional contribution factor comprises analyzing the vocal content to determine the emotional contribution factor based on at least one of a vocal tone or a text segment in the vocal content.

7. The computer-implemented method of claim 1, wherein the initial emotional state comprises an emotional valence value and an emotional arousal value, and wherein determining the updated emotional state comprises:
   removing first component of the emotional valence value due to the media; and
   removing a first component of the emotional arousal value due to the media.

8. The computer-implemented method of claim 1, wherein the initial emotional state further comprises an emotional dominance value, and wherein determining the updated emotional state comprises removing a first component of the emotional dominance value due to the media.

9. The computer-implemented method of claim 1, wherein the initial emotional state comprises a first emotion and a second emotion, and wherein determining the updated emotional state comprises:
   removing a contribution factor to the first emotion due to the media; and
   removing a contribution factor to the second emotion due to the media.

10. The computer-implemented method of claim 1, wherein the initial emotional state is an initial emotional state of the user at a particular time, and determining the updated emotional state further comprises determining the updated emotional state associated with the user at the particular time by removing the emotional contribution factor from the initial emotional state at the particular time.

11. One or more non-transitory computer-readable storage media including instructions that, when executed by one or more processors, cause the one or more processors to compute and analyze emotional state of a user, by performing the steps of:
   acquiring, via at least one sensor, sensor data associated with a user;
   determining, based on the sensor data, an initial emotional state associated with the user;
   determining an emotional content of media being listened to or consumed by the user;
   determining an emotional contribution factor to the initial emotional state of the user due to the emotional content of the media being listened to or consumed by the user; and
   determining an updated emotional state associated with the user by removing the emotional contribution factor from the initial emotional state using an additive technique, a subtractive technique, a conjunctive technique, a disjunctive technique, or a Bayesian model technique.

12. The one or more non-transitory computer-readable storage media of claim 11, wherein the steps further include:
   determining a second contribution factor of the initial emotional state based on a factor associated with the user; and
   removing the second contribution factor from the initial emotional state.

13. The one or more non-transitory computer-readable storage media of claim 12, wherein the factor is associated with an in-person conversation between the user and another person.

14. The one or more non-transitory computer-readable storage media of claim 12, wherein the factor is associated with a phone conversation between the user and another person.

15. The one or more non-transitory computer-readable storage media of claim 11, wherein the media comprises musical content, and wherein determining the emotional contribution factor comprises analyzing the musical content to determine the emotional contribution factor.

16. The one or more non-transitory computer-readable storage media of claim 11, wherein the media being listened to or consumed by the user comprises musical content, and wherein determining the emotional contribution factor comprises retrieving the emotional contribution factor from a database.

17. The one or more non-transitory computer-readable storage media of claim 11, wherein the media being listened to or consumed by the user comprises vocal content, and wherein determining the emotional contribution factor comprises analyzing the vocal content to determine the emotional contribution factor based on at least one of a vocal tone or a text segment in the vocal content.

18. The one or more non-transitory computer-readable storage media of claim 11, wherein the initial emotional state comprises an emotional valence value and an emotional arousal value, and wherein determining the updated emotional state comprises:
   removing a contribution factor to the emotional valence value due to the media being listened to or consumed by the user; and
   removing a contribution factor to the emotional arousal value due to the media being listened to or consumed by the user.

19. The one or more non-transitory computer-readable storage media of claim 11, wherein the initial emotional state further comprises an emotional dominance value, and wherein determining the updated emotional state comprises removing a contribution factor to the emotional dominance value due to the media.

20. A first endpoint device, comprising:
   a memory that includes instructions; and
   a processor that is coupled to the memory and, when executing the instructions:
      acquires, via at least one sensor, sensor data associated with a user;
      determines, based on the sensor data, an initial emotional state associated with the user;
      determines an emotional content of media being listened to or consumed by the user;
      determines an emotional contribution factor to the initial emotional state of the user due to the emotional content of the media; and
      determines an updated emotional state associated with the user by removing the emotional contribution factor from the initial emotional state using an additive technique, a subtractive technique, a conjunctive technique, a disjunctive technique, or a Bayesian model technique.

* * * * *